(12) United States Patent
Golan

(10) Patent No.: US 6,965,732 B2
(45) Date of Patent: Nov. 15, 2005

(54) LIQUID HEATING METHOD AND APPARATUS PARTICULARLY USEFUL FOR VAPORIZING A LIQUID CONDENSATE FROM COOLING DEVICES

(75) Inventor: Gady Golan, Hod Hasharon (IL)

(73) Assignee: A.T.C.T. Advanced Thermal Chips Technologies Ltd., Tel-Aviv (IL)

( * ) Notice: Subject to any disclaimer, the term of this patent is extended or adjusted under 35 U.S.C. 154(b) by 124 days.

(21) Appl. No.: 10/344,134

(22) PCT Filed: Aug. 16, 2001

(86) PCT No.: PCT/IL01/00766

§ 371 (c)(1),
(2), (4) Date: Feb. 7, 2003

(87) PCT Pub. No.: WO02/17681

PCT Pub. Date: Feb. 28, 2002

(65) Prior Publication Data

US 2003/0206730 A1 Nov. 6, 2003

Related U.S. Application Data

(60) Provisional application No. 60/240,834, filed on Oct. 17, 2000, provisional application No. 60/229,050, filed on Aug. 31, 2000, provisional application No. 60/229,049, filed on Aug. 31, 2000, provisional application No. 60/228,416, filed on Aug. 29, 2000, provisional application No. 60/226,666, filed on Aug. 22, 2000.

(51) Int. Cl.[7] .................................................. H05B 1/02
(52) U.S. Cl. .................... 392/399; 219/505; 338/13
(58) Field of Search .............................. 392/399, 502, 392/465, 466, 473, 479, 501; 219/505, 501, 219/494, 504; 338/13, 20, 27

(56) References Cited

U.S. PATENT DOCUMENTS

| | | | |
|---|---|---|---|
| 3,927,300 A | 12/1975 | Wada et al. | |
| 4,324,974 A | * 4/1982 | Steiner et al. | ............... 219/553 |
| 4,327,282 A | * 4/1982 | Nauerth | ...................... 219/541 |
| 4,371,777 A | * 2/1983 | Roller et al. | ................. 392/480 |
| 4,418,272 A | * 11/1983 | Roller et al. | ................. 219/541 |
| 4,529,868 A | 7/1985 | Bowen et al. | |
| 4,644,316 A | 2/1987 | Takeuchi et al. | |
| 4,677,280 A | 6/1987 | Kai | |

(Continued)

Primary Examiner—Thor S. Campbell
(74) Attorney, Agent, or Firm—G. E. Ehrlich (1995) Ltd.

(57) ABSTRACT

A method and heating device for heating a liquid, particularly useful for removing liquid condensate from cooling devices, by wetting a heating plate with the liquid and controlling the electrical power supply to maintain the heating plate at a the predetermined temperature above the boiling point of the liquid, such that when the heating plate is not wetted by the liquid, the electrical power supply to the heating plate is automatically maintained at a relatively low value, but as soon as the heating plate is wetted by the liquid, the electrical power supplied to the heating plate is automatically increased until the liquid is completely evaporated. The heating plate is heated by one or more PTC thermistors in which the electrical resistance increases with temperature to automatically maintain the predetermined temperature. Besides evaporating liquid condensate, the heating device is described for use in many other applications including steam generation, space heating and plastic molding.

15 Claims, 11 Drawing Sheets

U.S. PATENT DOCUMENTS

| | | | |
|---|---|---|---|
| 4,710,350 A * | 12/1987 | Petersen | 422/37 |
| 4,954,692 A | 9/1990 | Shikama et al. | |
| 5,198,640 A | 3/1993 | Yang | |
| 5,337,038 A | 8/1994 | Taniguchi et al. | |
| 5,377,298 A | 12/1994 | Yang | |
| 5,437,002 A | 7/1995 | Bennett | |
| 5,471,034 A | 11/1995 | Kawate et al. | |
| 5,520,892 A | 5/1996 | Bowen | |
| 5,598,502 A | 1/1997 | Takahashi | |
| 5,710,459 A | 1/1998 | Teng et al. | |
| 5,940,577 A | 8/1999 | Steinel | |
| 6,025,771 A | 2/2000 | Kobayashi et al. | |

* cited by examiner

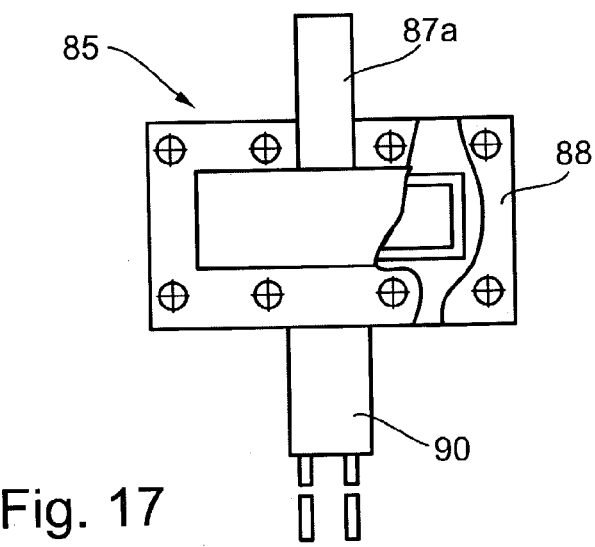
Fig. 17
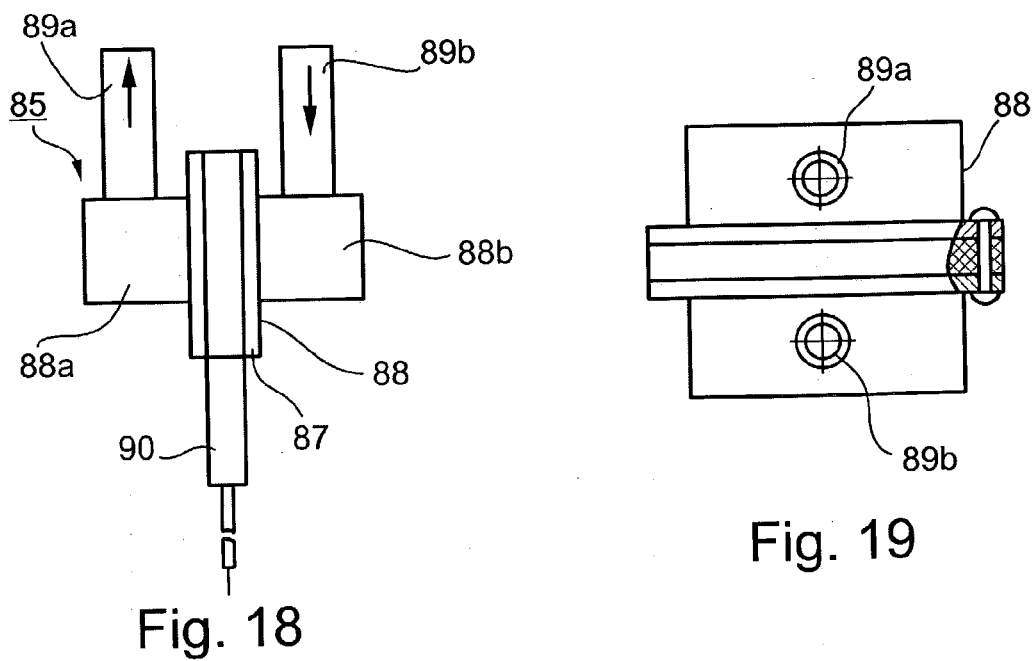
Fig. 18
Fig. 19

LIQUID HEATING METHOD AND APPARATUS PARTICULARLY USEFUL FOR VAPORIZING A LIQUID CONDENSATE FROM COOLING DEVICES

RELATED APPLICATIONS

The present application is related to Provisional Applications (1) No. 60/226,666 filed Aug. 22, 2000, (2) No. 60/228,416 filed Aug. 29, 2000 (3) No. 60/229,050 filed Aug. 31, 2000; (4) No. 60/229,049, filed Aug. 31, 2000 and (5) No. 60/240,834 filed Oct. 17, 2000, and claims the priority dates of those applications.

FIELD AND BACKGROUND OF THE INVENTION

The present invention relates to a method, to an electrical heating device, and to apparatus for heating a liquid. The invention is especially useful for vaporizing a liquid condensate produced during the operation of cooling devices, but is also useful for heating or vaporizing water in many other applications, some of which are described below for purposes of example.

The operation of cooling devices, such as air conditioners, refrigerators, and other types of heat pump machines, is generally accompanied by a condensation of water from the atmosphere. If such condensed water is not immediately removed, it will freeze and thereby reduce the operating efficiency of the heating device. At the present time, such condensed water is generally removed from air conditioners by drain tubes leading to the atmosphere or to condensate collection containers. However, there are many situations wherein removal of water condensate in such a manner is not possible or practical.

Another known technique for removing water condensate is by vaporizing the water condensate, but such known techniques generally require considerable electrical power consumption and/or relatively complicated control systems.

Thermistors are small electrical devices whose resistance decreases, and therefore whose conduction of electrical current increases, rapidly and predictably with a rise in temperature, used especially in heat measurement and in voltage regulators in communication circuits. PTC (positive temperature coefficient) thermistors are thermistors whose electrical resistance increases (rather than decreases) with a rise in temperature. PTC thermistors have a capability of providing a number of important advantages over conventional filament-type heating elements, including: simplified temperature sensing and control, large heat-transfer surfaces, longer service life since they are not subject to oxidation, and more safety particularly when used in environments containing fuel or ignitable substances.

However, PTC thermistors have number of drawbacks which have heretofore limited their use in heating applications. Thus, permanent connections to PTC thermistors, such as by soldering or welding, generally have short service lives because the differences in thermal coefficients of expansion at the connections produce strains and cracks during heating/cooling cycles. In addition, thermal gradients in PTC thermistors, due to non-uniform heat transfer or exposure to air or gas flow, create a "pinch effect" which reduces heat generation efficiency and service life. Further, high local electrical field strengths due to sharp edges or ridges may trigger an electric arc that can destroy the thermistor.

The prior art includes many patents directed to positive temperature coefficient thermistors, and to various applications of such thermistors. U.S. Pat. Nos. 5,598,502 and 5,471,034 disclose PTC thermistor devices for heating liquids wherein the PTC heating elements are enclosed. However, in both cases, the disclosed devices have thermal resistance between the PTC elements and the heat exchange members that reduces their heat transfer efficiency, and thereby their power output. In addition, such devices have the additional disadvantage of not being fully immersible and/or of requiring channels for the liquid through heat transfer members, which complicates their construction and integration into liquid systems to be heated. PTC devices are also described in U.S. Pat. Nos. 4,529,868; 4,644,316; 4,677,280; 4,954,692; 5,198,640; 5,337,038; 5,377,298; 5,520,892; 5,710,459; 6,025,771; Japanese 2-191303; and Japanese 3-74803.

OBJECTS AND BRIEF SUMMARY OF THE PRESENT INVENTION

An object of the present invention is to provide a novel method and apparatus for heating a liquid, particularly useful for the removal of water condensate from cooling devices in an efficient manner, but also useful in many other applications involving the heating of water and/or the generation of steam. Another object of the invention is to provide an electrical heating device particularly useful in the above method and apparatus, but also useful in many other applications as described below.

According to one broad aspect of the present invention, there is provided a method of heating a liquid, comprising: electrically heating a heating plate, via an electrical power supply, to a predetermined temperature above the boiling point of the liquid to be heated; wetting the heating plate with the liquid to be heated; and controlling the electrical power supply to maintain the heating plate at the predetermined temperature, such that when the heating plate is not wetted by the liquid, the electrical power supplied to the heating plate is automatically maintained at a relatively low value; but as soon as the heating plate is wetted by the liquid, the electrical power supplied to the heating plate is automatically increased to a relatively high value by the load produced by the wetting liquid, and is automatically controlled thereafter in response to said load to maintain said heating plate at said predetermined temperate, unless and until the liquid is completely evaporated, whereupon the electrical power supplied to the heating plate is automatically reduced to, and maintained at, the relatively low value until the heating plate is again wetted by the liquid to be heated.

According to further features in the preferred embodiment of the invention described below, the heating plate is heated by a positive temperature coefficient (PTC) heating device, particularly a PTC thermistor, in which the electrical resistance increases with an increase in temperature such as to effect self-regulation with respect to temperature, thereby obviating the need for costly temperature sensors and control circuitry.

In the preferred embodiment of the invention described below, the liquid to be heated is a water condensate of an electrically-operated cooling device to be evaporated. However, other embodiments are also described wherein the liquid to be heated is water to be vaporized in an electrical appliance, such as a coffee maker, steam iron, a steam generator, or the like.

According to another aspect of the present invention, there is provided apparatus for heating a liquid, comprising: a heating plate adapted to be wetted by the liquid to be vaporized; a heater device for heating the heating-plate; and an electrical power supply for energizing the heater device. The electrical power supply is automatically controlled to maintain the heating plate at a predetermined temperature above the boiling point of the liquid to be heated such that when the heating plate is not wetted by the liquid, the electrical power supply to the heating plate is automatically maintained at a relatively low value; but as soon as the heating plate is wetted by the liquid, the electrical power supplied to the heating plate is automatically increased to a relatively high value by the load produced by the wetting liquid, and is automatically controlled thereafter in response to said load to maintain said heating plate at said predetermined temperate, unless and until the liquid is completely evaporated, whereupon the electrical power supplied to the heating plate is automatically reduced to, and maintained at, the relatively low value until the heating plate is again wetted by the liquid to be heated.

According to a further features of this aspect of the invention, the PTC heating device includes a frame of electrically-insulating material, at least one PTC thermistor secured within the frame, and a pair of electrodes attached to the opposite faces of the frame and having substantially planar faces in contact with the PTC thermistor therein.

According to still further features in the described preferred embodiment, the frame is constructed to receive a plurality of positive temperature coefficient thermistors in side-by-side relation, with the opposite faces of the thermistors substantially flush with each other so as to be contacted by the substantially planar faces of the pair of electrodes. In addition, the frame is of electrically-insulating, thermally-conductive ceramic material.

According to a still further aspect of the present invention, there is provided an electrical heating device comprising a heating unit including: a metal plate; a pair of flat PTC thermistors located on one face of the metal plate; an electrical connector located on the one face of the metal plate between the PTC thermistors and electrically connected thereto; and a pair of U-shaped clamps overlying the PTC thermistors and engaging the opposite face of the radiator plate to fix the PTC thermistors thereto. Preferably, the heating unit is putted within a thermally-conductive electrically-insulating putting material.

A number of applications of such an electrical heating device are described, including space heaters, plastic mold heaters, water heaters and coffee machines, coffee pot heaters, and steam generators in electric iron heaters.

As will be described below, a number of important advantages are attainable particularly where the heating devices are positive temperature coefficient heaters, including: minimizing power consumption; obviating the need for temperature sensors and complicated electronic controls; long useful life since the PTC heating devices are generally oxides and are therefore not affected by oxidation; substantial elimination of the possibility of over-heating since the PTC device is fixed to a set temperature; high rate of heating and cooling; substantial non-sensitivity to variations in the supply voltage; low cost; and/or low weight.

Further features and advantages of the invention will be apparent from the description below.

BRIEF DESCRIPTION OF THE DRAWINGS

The invention is herein described, by way of example only, with reference to the accompanying drawings, wherein:

FIGS. 17, 18 and 19 are front, side and top views, respectively, of the electrical heating device in the space heater of FIG. 16;

DESCRIPTION OF PREFERRED EMBODIMENTS

Figure 1:
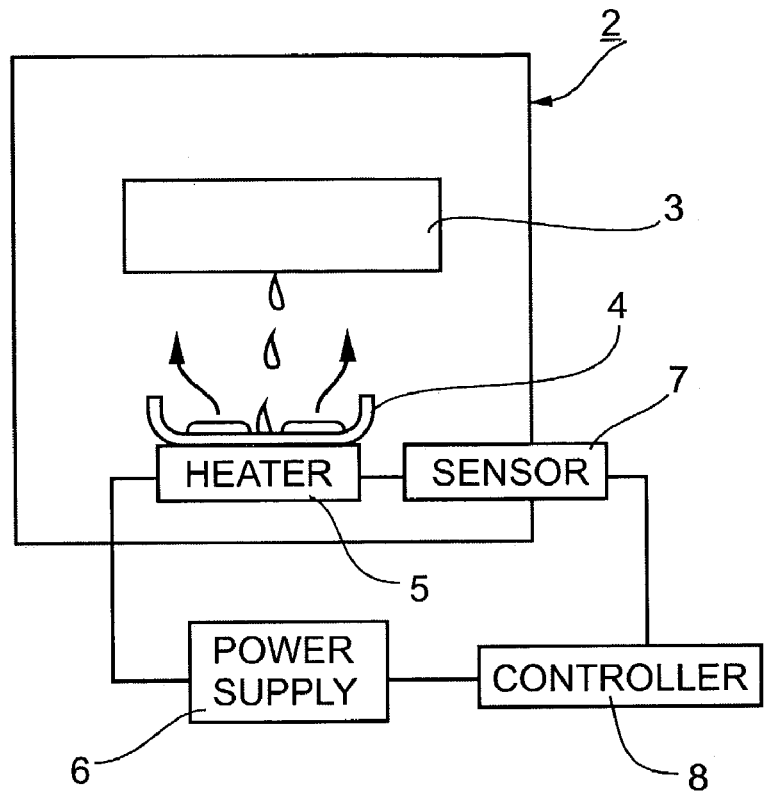
FIG. 1 illustrates one form of apparatus constructed in accordance with the present invention for the automatic removal of a liquid condensate from cooling devices.

With reference first to FIG. 1, there is schematically illustrated a cooling device, such an air conditioner 2, which produces, during its normal operation, a water condensate by the cooling of the water within the atmosphere in contact with the cooling surface of the device. This water condensate is directed to, and/or collected in, a collector schematically shown at 3.

In a conventional air conditioner, the condensate is removed via a drain tube leading to the atmosphere. According to the present invention however, the condensate is removed by vaporization via a heating plate 4 wetted by the water condensate, and heated by heater device 5 energized by an electrical power supply 6. As will be described more particularly below, the heating plate 4 is heated to a predetermined high temperature, above the boiling point of the water condensate. This predetermined high temperature may be preset and, in the embodiment illustrated in FIG. 1, is thereafter continuously sensed by a temperature sensor 7. The sensor has an output connected to a controller 8 for controlling the electrical power supply 6 in order to maintain the heating plate at the preset predetermined temperature.

In a more preferred embodiment of the invention to be described below with respect to FIG. 2, the heating plate 4 includes one or more positive temperature coefficient (PTC) thermistors, in which the electrical resistance increases with an increase in current, such as to effect self-regulation with respect to temperature. Accordingly, and as will be described below with respect to FIG. 2, when the heater is constituted of one or more PTC thermistors, the temperature sensor 7 and the controller 8 are omitted since their functions are performed automatically by the PTC thermistors.

In the apparatus illustrated in FIG. 1, the heating plate 4 is preset and maintained at a temperature of e.g., 250° C., well above the boiling point of the water condensate. Accordingly, when the heating plate 4 is not wetted by the water condensate, the electrical power supplied to the heater device 5 is of a relatively low value because of the relatively small quantity of electrical energy needed to maintain the heating plate 4 at the predetermined temperature of 250° C. However, as soon as the heating plate 4 is wetted by the water condensate, the condensate produces a cooling effect on the heating plate 4, thereby substantially increasing the thermal load on the heater device 5 and the energy level required to be supplied by the power supply 6 to maintain the predetermined temperature of 250° C. Accordingly, the condensate wetting the heating plate 4 will be rapidly vaporized by the increased power supplied to the heating plate. When the vaporization is completed, the thermal load on the heater device is substantially reduced, and therefore the electrical power supplied to the heater device 5 will be automatically reduced to and maintained at the relatively low value.

The system illustrated in FIG. 1 thus consumes a relatively small amount of electrical energy whenever the heating plate 4 is dry, but as soon as wetted by condensing water, the control system automatically and immediately increases the power supplied to the heater device 5 to rapidly vaporize the wetting condensate, and then automatically returns to the relatively low value until again wetted by condensate.

Figure 2:
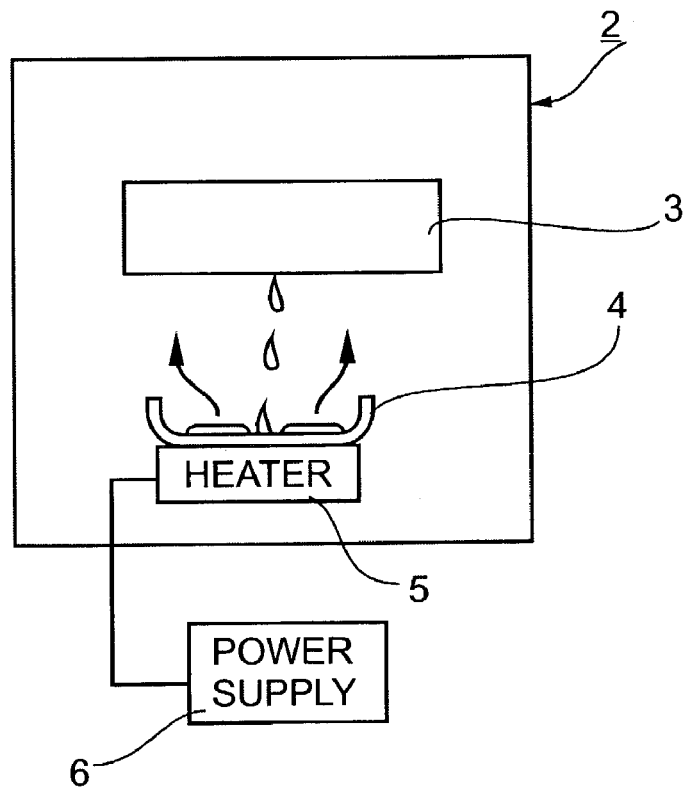
FIG. 2 illustrates apparatus similar to that of FIG. 1 but of a simplified construction enabled by the use of PTC (positive temperature coefficient) thermistors as the heating device.

FIG. 2 illustrates apparatus similar to that of FIG. 1 but substantially simplified by the use of one or more PTC (positive temperature coefficient) thermistors as the heater device 5. As briefly described above, such devices increase their electrical resistance with an increase in load so as to be substantially self-regulating in maintaining the predetermined temperature with variations in the load; accordingly, the use of such devices eliminates the need for the temperature sensor 7 and the controller 8 of FIG. 1, as indicated above.

One construction of the heater device 5 for heating the heating plate 4 is more particularly illustrated in FIGS. 3–8. Briefly, it includes a frame, generally designated 10; one or more heating elements, two being shown and designated 21, 22, respectively, secured to the frame; a pair of radiator plates 31, 32 secured together with the heating elements 21, 22 and the frame 10 in between; and a pair of intermediate plates 41, 42 between the two radiator plates 31, 32 and their respective faces of the heating elements 21, 22 secured by the frame 10. As will be described more particularly below, the radiator plates 31, 32 provide paths of high thermal conductivity with respect to the opposed faces of the heating elements 21, 22 and the heating plate 4 such as to maximize the heat transfer from the heating elements to the heating plate, and also to minimize temperature variations in the surfaces of the heating elements.

Figures 3, 5:
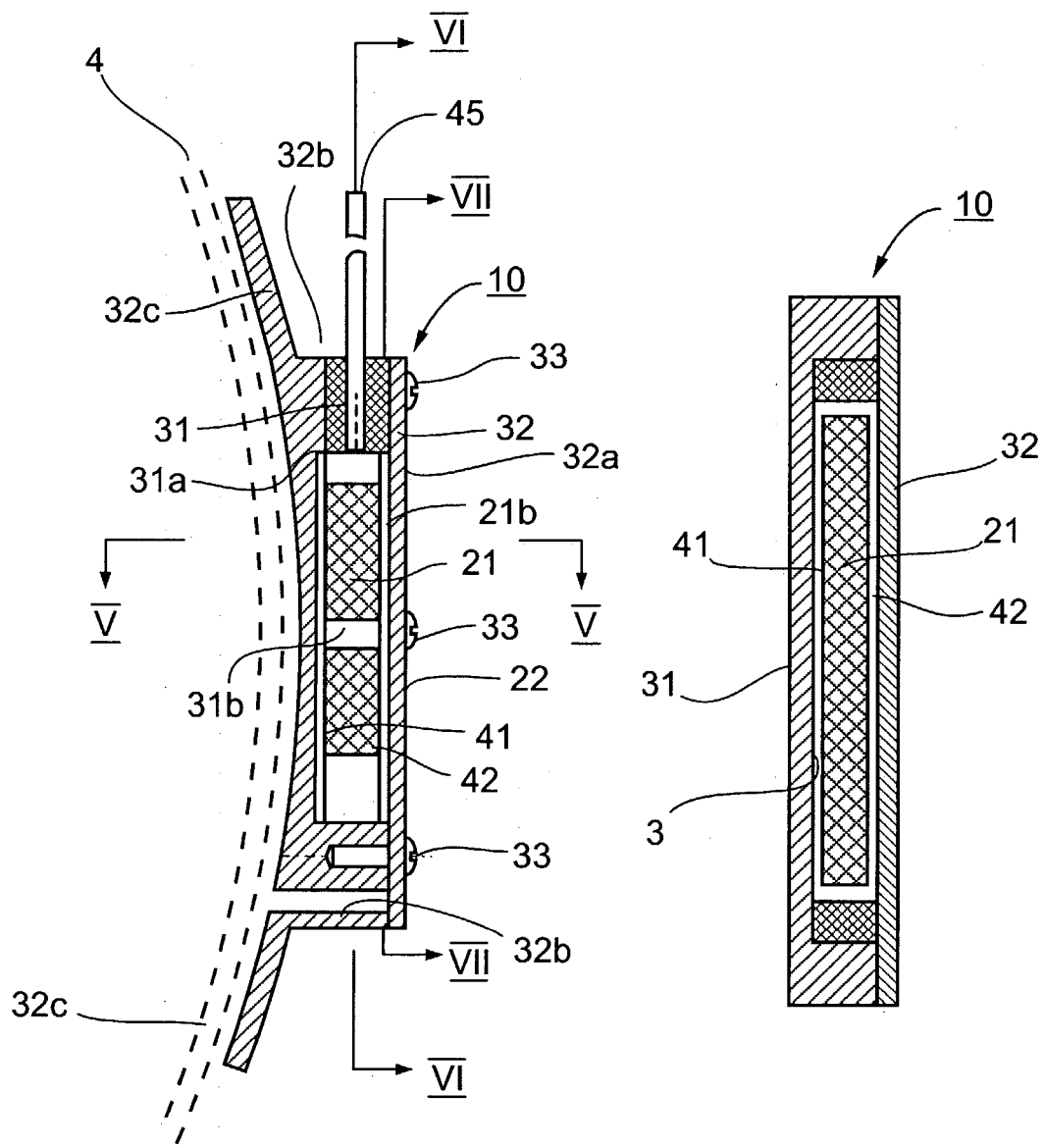
FIG. 3 is an enlarged sectional view of the heating plate and heating device in the apparatus of FIG. 1.
FIGS. 5, 6 and 7 are sectional views along lines V—V, VI—VI, and VII—VII of FIG. 3.

The intermediate plates 41, 42 serve as electrodes for making electrical connections to the heating elements 21, 22 from the lead-in wires 45 (FIG. 3). Since the intermediate plates 41, 42 are also in the paths of high thermal conductivity, they are also made of thermally-conductive material, but they include an electrically-conductive layer on the inner faces, as shown at 42a in FIG. 4, in contact with the outer faces of the heating elements 21, 22 to provide the electrical connections to those heating elements from the lead-in wires 45. The outer faces of the thermally-conductive intermediate plates 41, 42, however, are electrically insulating since they are in contact with the radiator plates 31, 32 as shown in FIG. 4 with respect to intermediate plate 42 and radiator plate 32.

Figure 6:
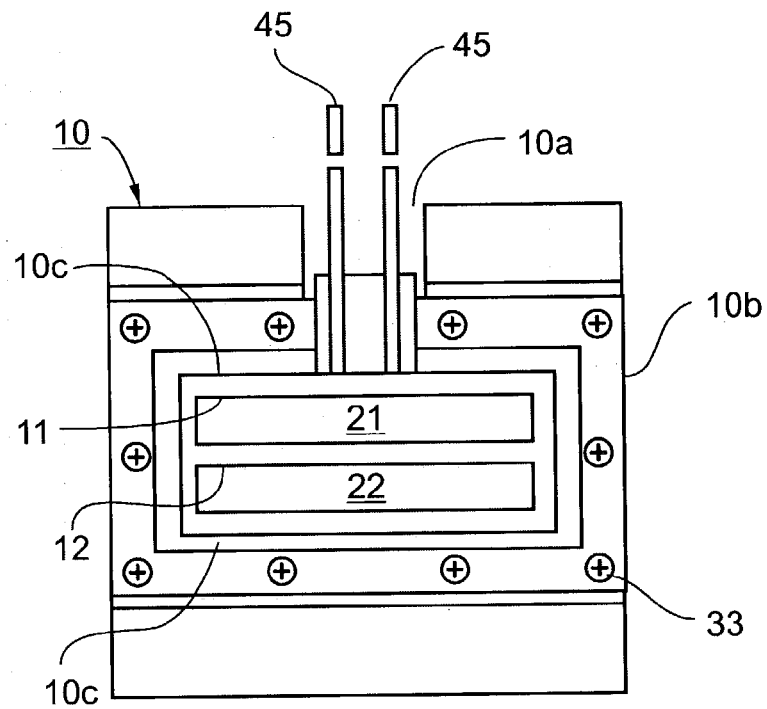
Figure 7:
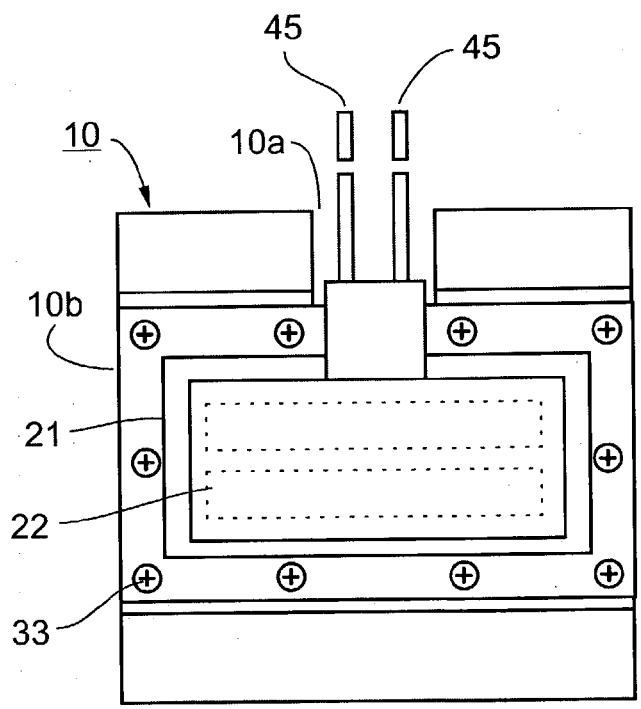
Figure 8:
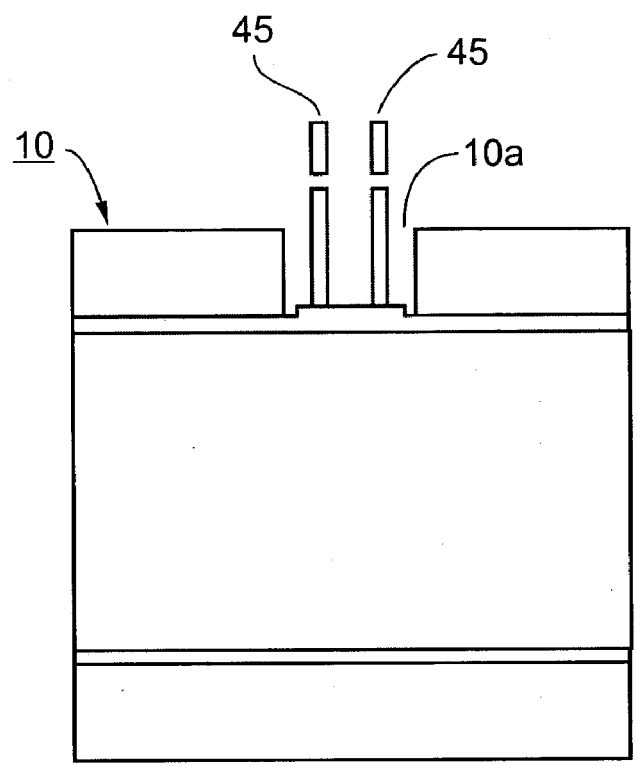
FIG. 8 is a plan view of the heating device of FIG. 3 after detached from the heating plate.

The frame 10 is of electrically and thermally insulating heat-resistant material. As shown in FIGS. 6–8, it is formed with a lead-in section 10a for accommodating the lead-in wires 45, and a main section 10b for receiving the heating elements 21, 22. For this purpose, the main section 10b of frame 10 is formed with an array of ribs 10c defining two rectangular openings 11, 12 (FIG. 6) for receiving the two heating elements 21, 22, respectively.

The heating elements 21, 22 are positive temperature coefficient (PTC) thermistors. They are fabricated with opposed faces, e.g., 21a, 21b (FIG. 3) which are substantially flat, parallel, and metallized, e.g., by the provision of a coating of a conductive metal such as aluminum, to provide contact surfaces of high thermal and electrical conductivity.

Figure 4:
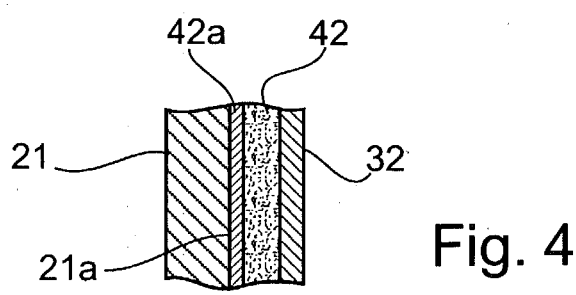
FIG. 4 is an enlarged fragmentary view of a portion of FIG. 3.

The intermediate plates 41, 42, as indicated earlier, are of a material which is thermally conductive and electrically insulating, except for the inner surface of these plates contacting the heating elements 21, 22; such inner surface are of electrically conductive material as shown at 42a, FIG. 4, to enable the intermediate plates to serve as electrodes for making the electrical connections from the lead-in wires 45 to the heating elements. Examples of materials which can be used for the intermediate plates 41, 42, include ceramic materials, such as $Al_2O_3$, in which the inwardly-facing surfaces in contact with the flat faces (e.g., 21a, FIG. 4) of the heating elements 21, 22 are coated with a conductive metal, such as aluminum.

The two radiator plates 31, 32 are fixed to each other and to the heating plate 4 by fasteners 33 to enclose the heater elements 21, 22 together with the frame 10 and the intermediate plates 41, 42. Fasteners 33 are of metal to provide paths of high thermal conductivity with respect to the opposite faces of the heating elements, and also with respect to the heating plate 4, such as to maximize the heat transfer from the heating elements to the heating plate 4 and to minimize temperature variations in the surfaces of the heating elements.

The latter function is particularly significant to avoid the "pinch effect" which may be caused by an uneven mechanical contact of the electrodes (the electrically-conductive surfaces, e.g., 42a, FIG. 4, of the intermediate plates 41, 42), with the heating elements, producing thermal gradients due to unbalanced heat transfer. This could result in reduced heat generation efficiency and reduced life time of the heating elements. For this purpose, the radiator plates 31, 32 are made of material having high thermal and electrical conductivity, such as aluminum, and are fabricated so that their masses effect a generally uniform thermal energy transfer from the opposite sides of the heating elements 21, 22 to the heating plate 4.

The inner radiator plate 31, e.g., the one facing the heating plate 4 of the condensate collector 3, is formed with an inner face 31a corresponding to the contour of the heating plate 4. The opposite face of radiator plate 31 is formed with a cavity 31b for accommodating the heating elements 21, 22, together with the frame 10 and intermediate plate 41 provided at that side of the heating elements.

Radiator plate 32 at the opposite side of the heater device 5 includes a main plate section 32a of substantially flat and uniform thickness and dimensioned to cover the two heating elements 21, 22, intermediate plate 42 at that side of the heating elements, and the lead-in section 10a of the insulating frame 10. The opposite ends of the main radiator section 32a are formed with flanges 32b extending transversely towards radiator plate 31. Flanges 32b terminate in outwardly-extending sections 32c engageable with, and conforming to the contour of, the heating plate 4 so as to provide good thermal contact with the heating plate.

The metal fasteners 33 secure radiator plate 32 to radiator plate 31 with the heating elements 21, 22, the frame 10, and the intermediate plates 41, 42 in between. These fasteners should be applied to firmly compress the foregoing elements together to provide good thermal contact between them, and good electrical contact between the electrically-conductive surface (e.g., 42a, FIG. 4) of the intermediate plates 41, 42 with their respective faces (e.g., 21a) of the heating elements 21, 22.

When so-assembled, the heater device 5 may be applied in any suitable manner to the heating wall 4, as by fasteners, or by the use of a thermally and electrically conductive adhesive, such as Ceramabond™ TM5526, a high-temperature adhesive produced by Aremco Products Inc. of Ossning, N.Y., 10562, USA. Such a thermally and electrically conductive adhesive may also be applied between the contacting surfaces of the intermediate plates 41, 42 and/or radiator plates 31, 32, of the heating elements 21, 22 to enhance the thermal conductivity between those surfaces, and also the electrical conductivity between the electrically-conducting surfaces of the intermediate plates 41, 42 with the respective faces of the heating elements 21, 22.

A heater device as described above, weighing 400 grams, was constructed with two PTC thermistor heating elements and with the heating plate 4 preset to a temperature of 250° C. When the heating plate was dry, the power consumption was 80 watts. The heating plate 4 was then wetted with 25 cc of water, whereupon the power consumption was immediately increased to 350 watts for a period of 40 seconds during which time the water was vaporized, and within three minutes thereafter, the power consumption returned to its steady state of 80 watts with the temperature remaining constant at 250° C.

A second experiment was conducted, as described above, with a heating assembly of different dimensions. In that case the 25 cc of water caused an increase of power consumption from a dry steady-state condition of 130 watts, to 500 watts; took ten seconds to be vaporized; and within three minutes thereafter returned to its steady-state condition of 130 watts.

Figure 9:
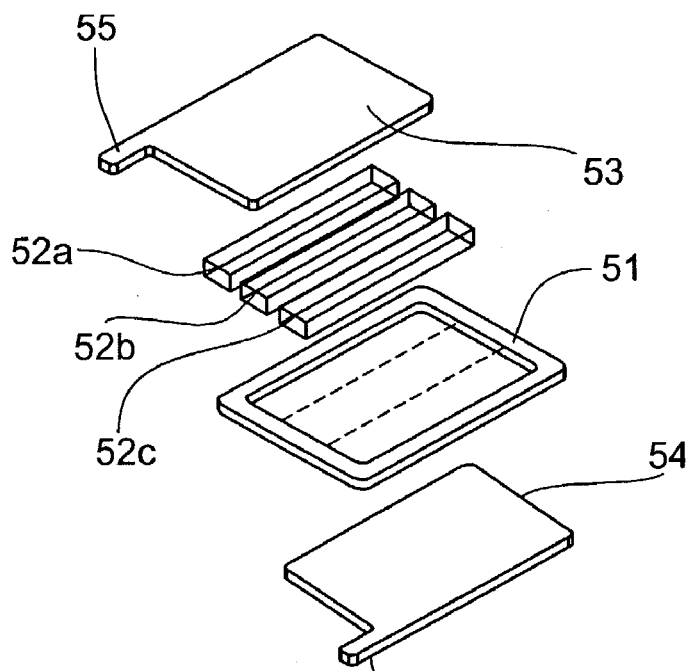
FIG. 9 is an exploded view illustrating the main components of another type of heating device particularly useful in the apparatus of FIG. 2.
Figures 10, 11:
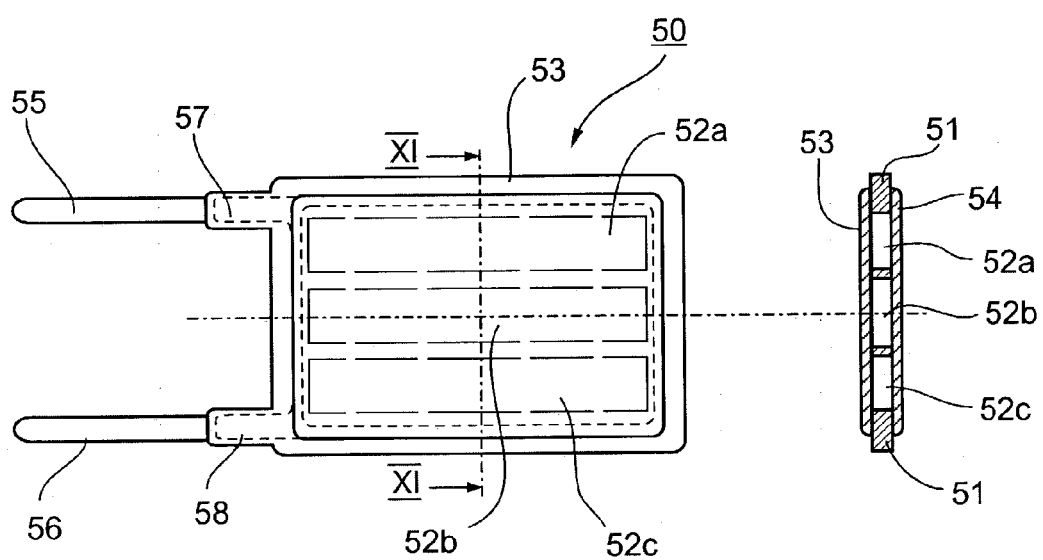
FIG. 10 is a plan view illustrating the heating device of FIG. 9 in assembled condition.
FIG. 11 is a sectional view along line XI—XI of FIG. 10.

FIGS. 9–11 illustrate another construction of PTC heating device that may be used. The heating device illustrated in FIGS. 9–11, and therein generally designated 50, includes a frame 51 of electrically-insulating, thermally-conductive material constructed to receive a plurality of PTC thermistors 52a–52c in side-by-side relationship. The PTC thermistors have flat outer faces which are substantially flush with each other when received within the frame 51. The heating device further includes a pair of planar electrodes 53, 54, secured to the frame 51, e.g., by an electrically-conductive adhesive, and having planar faces engaging the opposite faces of the PTC thermistors 52a–52c within the frame. Each of the electrodes 53, 54 is formed with a terminal 55, 56 projecting from one end, with each terminal receiving an insulating sleeve 57, 58.

The frame 51 is made of an electrically-insulating, thermally-conductive material, preferably a ceramic material such as $Al_2O_3$. The electrodes 53, 54 are made of a metal, such as aluminum.

The construction of the heating device illustrated in FIGS. 9–11 also produces even, balanced heating over the complete surface of the outer electrodes 53, 54, so as to reduce thermal gradients, and to avoid the "pinch effect".

Figure 12:
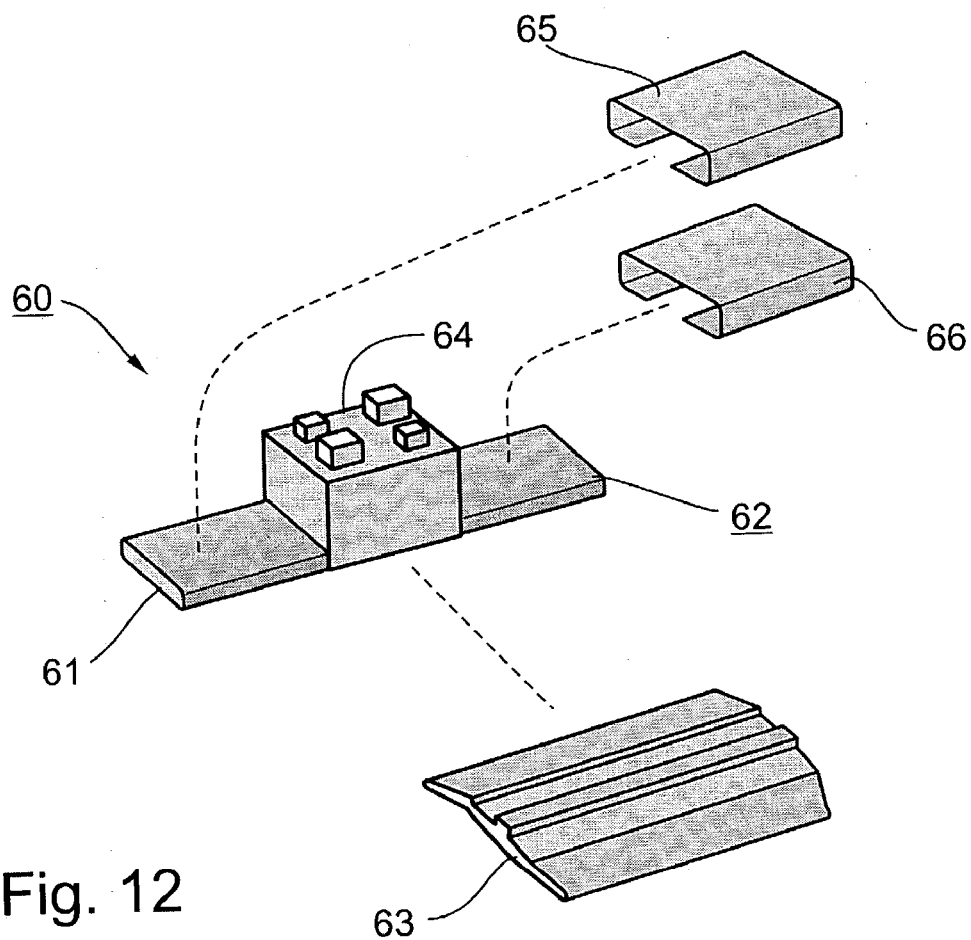
FIG. 12 is an exploded view illustrating another electrical heating device constructed in accordance with the present invention.
Figure 13:
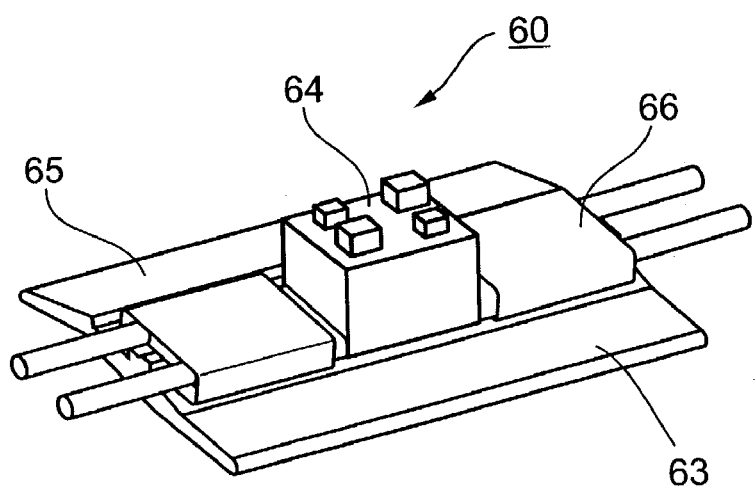
FIG. 13 is an assembly view of the electrical heating device of FIG. 12.

FIG. 12 is an exploded view, and FIG. 13 is an assembled view, illustrating another electrical heating device constructed in accordance with the present invention. The electrical heating device illustrated in FIGS. 12 and 13, and therein generally designated 60, includes a pair of PTC thermistors 61, 62, located on one face of a metal radiator plate 63. An electrical connector 64 is also placed on the metal radiator plate 63 between the two PTC thermistors 61, 62, and is electrically connected to them. A pair of U-shaped metal clamps 65, 66 overlie the PTC thermistor 61, 62 and engage the opposite face of the metal radiator plate 63 to fix the two PTC thermistors on that plate.

After the foregoing elements have been assembled, they are preferably dipped in a bath of a thermally-conductive electrically-insulating putting material so as to putt the assembled elements to define an unitary electrical heating unit.

Figure 14:
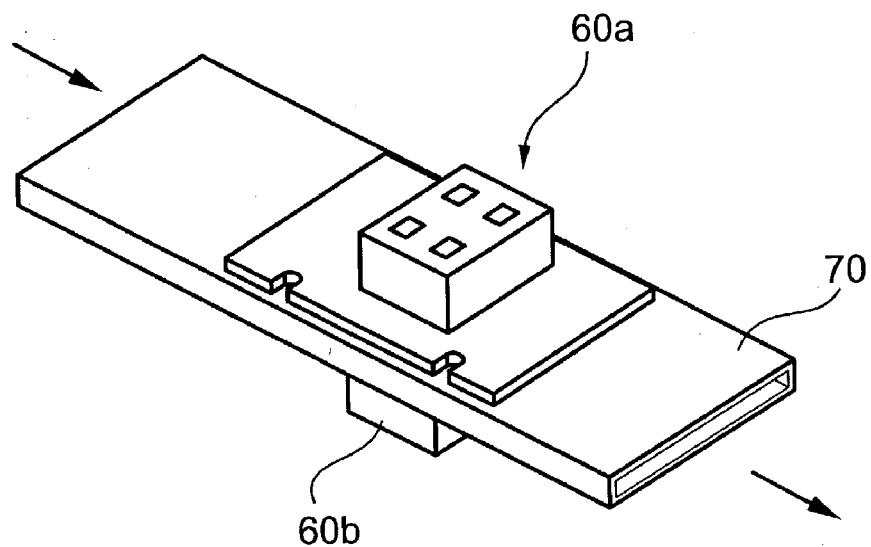
FIG. 14 illustrates the use of the heating device of FIGS. 12 and 13 for heating a fluid flowing through a conduit.

FIG. 14 illustrates one application of the electrical heating unit 60 shown in FIGS. 12 and 13, for heating a fluid flowing through a conduit 70. As shown in FIG. 14, two such heating units 60a, 60b are applied to the opposite faces of the conduit 70 so as to quickly heat any fluid flowing therethrough. Since the electrical heating units 60a, 60b include PTC thermistors, as described above, it will be seen that the power consumption by the electrical heating units will automatically vary according to the thermal load, namely to the temperature, rate of flow, etc., of the fluid flowing through the conduit 70.

Figure 15:
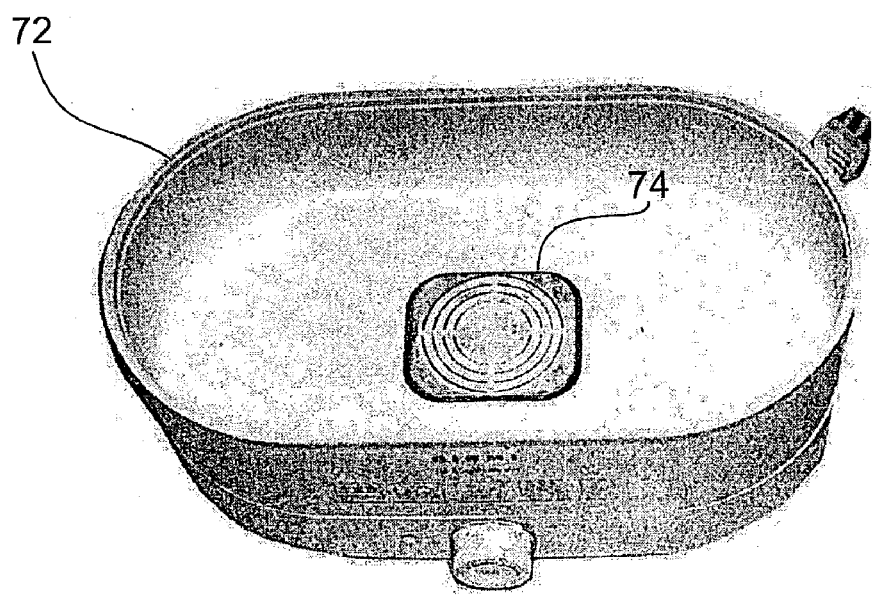
FIG. 15 illustrates the electrical heating device of FIGS. 12 and 13 in a cooking utensil, particularly a cooking receptacle for cooking food by steam heating.

FIG. 15 illustrates a cooking utensil, more particularly a steam cooker receptacle 72, equipped with an electrical heater unit, therein shown at 74, of any of the foregoing constructions. Since such a heating unit also includes one or more PTC thermistors, such a construction provides the advantages of low costs, low power consumption, extremely long life, a minimum of controls, and substantially free of explosion hazards.

Figure 16:
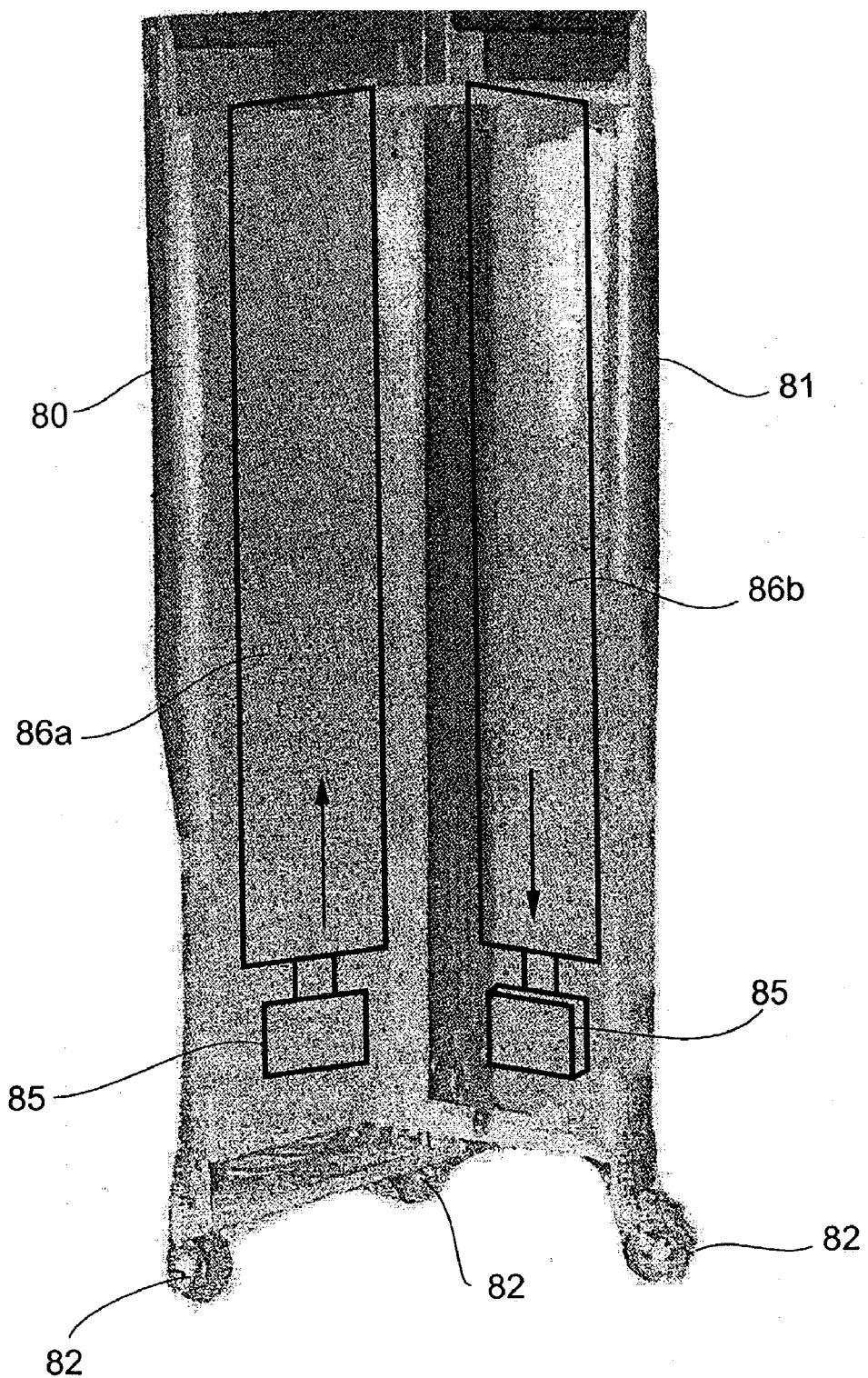
FIG. 16 illustrates the electrical heating device of FIGS. 12 and 13 in a space heater.

FIG. 16 illustrates the invention as applied to a space heater, including two radiating panels 80, 81, pivotally mounted to each other so as to be openable to an operating position, or foldable to a compact position for storage or transportation. The two panels are mounted on wheels 82 for portability, and are provided with handles 84 at the upper ends to facilitate their movement from place-to-place.

The lower end of each panel 80, 81, is provided with an electrical heating unit 85 communicating with a conduit having an upwardly-extending section 86a on one face of the radiating panel, and a downwardly-extending section 86b on the opposite face of the radiating panel.

The electrical heating unit 85 includes a housing 88 containing one or more PTC thermistors 87, which housing includes one section 88a connected to the bottom of the upwardly-extending conduit section 86a, and a second housing section 88b connected to the bottom of the downwardly-extending conduit section 86b.

The PTC thermistor or thermistors 87 within the housing 88 are energized by electric power supply cable 89. As one example, the fluid within the housing 88 may be glycol.

It will thus be seen that as the thermistor or thermistors within housing 88 are energized by the electrical supply, they convert the glycol within housing 88 to a vapor, which rises via the outlet 89a through the upwardly-extending conduit section 86a along one face of the respective radiator plate 80, 81, and then through the downwardly-extending conduit section 86b on the opposite face of the respective radiator plate 80, 81, back to the inlet 89b of the heater housing 88. During this passageway of the glycol, it condenses and releases heat which is radiated from the radiating plates 80, 81, returning via the downwardly-extending conduit section 86b on the opposite face of the respective radiating plate 80, 81, back to the inlet 89b of the heater housing, where the glycol is reheated before again moving through the upwardly-extending conduit section 86a of the respective radiating plate.

Figure 20:
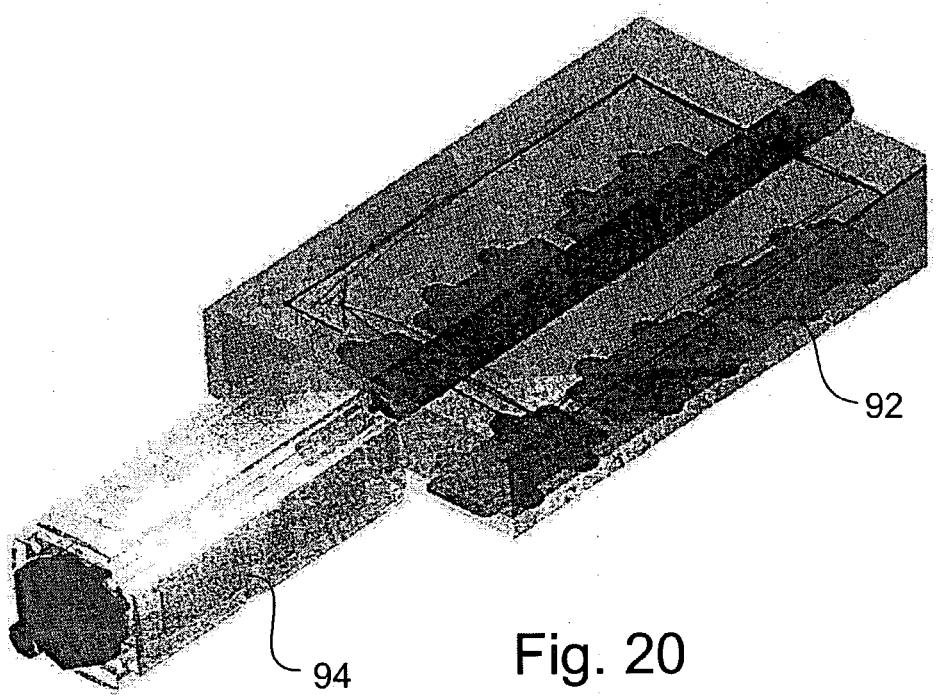
FIG. 20 illustrates an electrical heating device for heating a plastic mold used in injection molding of plastic.

FIG. 20 illustrates the electrical heating unit constructed in accordance with any of the embodiments described above, and generally designated 92 in FIG. 20, attached to a mold 93 for molding plastic material injected into the mold via an injector 94. Such an application of the invention provides all the advantages described above in plastic injection apparatus for molding plastic material.

Figure 21:
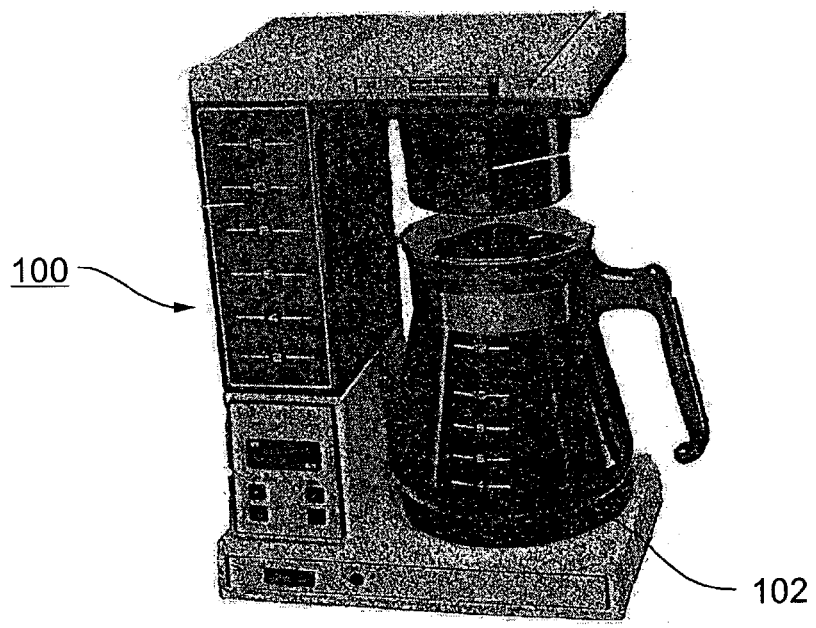
FIG. 21 illustrates a coffee percolator constructed with an electrical heating device in accordance with the present invention.
Figure 22:
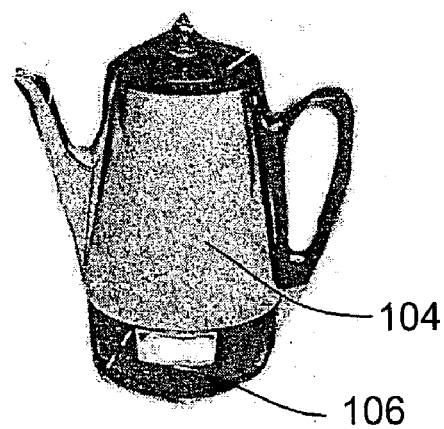
FIG. 22 illustrates a coffee espresso machine constructed with an electrical heating device in accordance with the invention.
Figure 23:
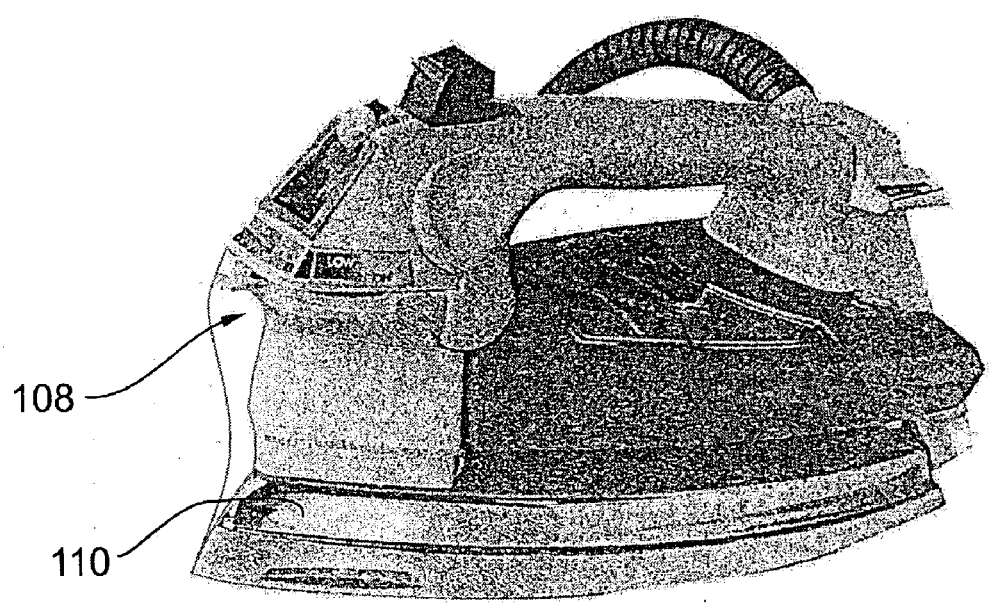
FIG. 23 illustrates an electrical steam generator constructed with an electrical heating device in accordance with the invention.

It will be appreciated that either of the electrical heaters described above could be incorporated into an electrical chip assembly and used as electrical heater units for many other types of devices. Thus, FIG. 21 illustrates a coffee espresso machine 100 including such a heater element 102; FIG. 22 illustrates a coffee percolator 104 including such a heater element 106; and FIG. 23 illustrates a steam pressing iron 108 including such a heating element 110. In all these devices, the heating element is preferably one or more chips including one or more PTC thermistors according to any of the constructions described above mounted in heat-exchange relationship with respect to a heating plate to be wetted by the liquid to be heated or vaporized.

While the invention has been described with respect to several preferred embodiments, it will be appreciated that these are set forth merely for purposes of example, and that many variations and other applications of the invention may be made. For example, springs could be provided within the device, or externally of the device, for firmly pressing the radiation plates and the electric plates against the opposite ends of the heating;elements secured within the frame. Also, the frame could include spacers for precisely spacing the heating elements with respect to each other. Further, in the vaporization apparatus of FIG. 1, conventional units could be used for the heating elements, temperature sensor, and control, for heating and maintaining the heating plate at the predetermined temperature.

Also, while the invention has been described herein with respect to heater units, it will be appreciated that features of the invention could also be used in other types of chip assemblies, for example in communication or electrical power assemblies, in order to dissipate heat generated by the chip assembly, or to detect or measure heat generated by another device.

Many other variations and applications of the invention will be apparent to those skilled in the art.

What is claimed is:

1. A method of heating a liquid, comprising:
   electrically heating a heating plate, via an electrical power supply, to a predetermined temperature above the boiling point of the liquid to be heated;
   wetting the heating plate with the liquid to be heated;
   and controlling said electrical power supply to maintain said heating plate at said predetermined temperature, such that when the heating plate is not wetted by said liquid, the electrical power supplied to the heating plate is automatically maintained at a relatively low value; but as soon as the heating plate is wetted by said liquid, the electrical power supplied to the heating plate is automatically increased to a relatively high value by the load produced by the wetting liquid, and is automatically controlled thereafter in response to said load to maintain said heating plate at said predetermined temperature, unless and until the liquid is completely evaporated, whereupon the electrical power supplied to the heating plate is automatically reduced to, and maintained at, said relatively low value until the heating plate is again wetted by the liquid to be heated.

2. The method according to claim 1, wherein said heating plate is heated by a positive temperature coefficient heating device in which the electrical resistance increases with an increase in temperature such as to effect self-regulation with respect to temperature.

3. The method according to claim 2, wherein said positive temperature coefficient heating device includes at least one thermistor.

4. The method according to claim 3, wherein said liquid to be heated is a water condensate of an electrically-operated cooling device to be evaporated.

5. The method according to claim 1, wherein said liquid is water to be heated or vaporized in an electrical appliance.

6. The method according to claim 1, wherein said liquid is water to be vaporized in a steam generator.

7. A method of removing a liquid condensate from a cooling device, comprising:
   electrically heating a heating plate, via an electrical power supply, to a predetermined temperature above the boiling point of the liquid condensate;
   conducting the liquid condensate to the heating plate to wet the heating plate;
   and controlling said electrical power supply to maintain said heating plate at said predetermined temperature, such that when the heating plate is not wetted by said liquid, the electrical power supply to the heating plate is automatically maintained at a relatively low value; but as soon as the heating plate is wetted by said liquid, the electrical power supplied to the heating plate is automatically increased to a relatively high value by the load produced by the wetting liquid, until the liquid is completely evaporated, whereupon the electrical power supplied to the heating plate is automatically reduced to, and maintained at, said relatively low value until the heating plate is again wetted by the liquid condensate.

8. The method according to claim 7, wherein said heating plate is heated by a positive temperature coefficient heating device in which the electrical resistance increases with an increase in temperature such as to effect self-regulation with respect to temperature.

9. The method according to claim 8, wherein said positive temperature coefficient heating device includes at least one thermistor.

10. Apparatus for heating a liquid, comprising:
a heating plate adapted to be wetted by the liquid to be vaporized;
a heater device for heating said heating-plate;
and an electrical power supply for energizing said heater device;
said electrical power supply being automatically controlled to maintain said heating plate at a predetermined temperature above the boiling point of the liquid to be heated such that when the heating plate is not wetted by said liquid, the electrical power supply to the heating plate is automatically maintained at a relatively low value; but as soon as the heating plate is wetted by said liquid, the electrical power supplied to the heating plate is automatically increased to a relatively high value by the load produced by the wetting liquid, and is automatically controlled thereafter in response to said load to maintain said heating plate at said predetermined temperate, unless and until the liquid is completely evaporated, whereupon the electrical power supplied to the heating plate is automatically reduced to, and maintained at, said relatively low value until the heating plate is again wetted by the liquid to be heated.

11. The apparatus according to claim 10, wherein said heating plate is heated by a positive temperature coefficient (PTC) heating device in which the electrical resistance increases with an increase in temperature such as to effect self-regulation with respect to temperature.

12. The apparatus according to claim 11, wherein said PTC heating device includes a frame of electrically-insulating material, at least one PTC thermistor secured within said frame, and a pair of electrodes attached to the opposite faces of the frame and having substantially planar faces in contact with said PTC thermistor therein.

13. The apparatus according to claim 12, wherein said frame is constructed to receive a plurality of said PTC thermistors in side-by-side relation, with the opposite faces of the thermistors substantially flush with each other so as to be contacted by said substantially planar faces of the pair of electrodes.

14. The apparatus according to claim 12, wherein said frame is of electrically-insulating, thermally-conductive ceramic material.

15. The apparatus according to claim 12, wherein each of said electrodes includes a substantially planar plate integrally formed with a terminal projecting from one side thereof.

* * * * *